(12) United States Patent
Dontu et al.

(10) Patent No.: US 11,556,372 B2
(45) Date of Patent: Jan. 17, 2023

(54) PARAVIRTUAL STORAGE LAYER FOR A CONTAINER ORCHESTRATOR IN A VIRTUALIZED COMPUTING SYSTEM

(71) Applicant: VMware, Inc., Palo Alto, CA (US)

(72) Inventors: Venkata Balasubrahmanyam Dontu, Sunnyvale, CA (US); Divyen Kiritbhai Patel, Milpitas, CA (US); Raunak Pradip Shah, Burlingame, CA (US); Sandeep Pissay Srinivasa Rao, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 222 days.

(21) Appl. No.: 16/893,881

(22) Filed: Jun. 5, 2020

(65) Prior Publication Data
US 2021/0382741 A1 Dec. 9, 2021

(51) Int. Cl.
*G06F 9/455* (2018.01)
*G06F 9/54* (2006.01)

(52) U.S. Cl.
CPC ............ *G06F 9/45558* (2013.01); *G06F 9/54* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 9,912,558 B2* | 3/2018 | Chou | ................... | H04L 41/142 |
| 10,362,096 B2* | 7/2019 | Stefanov | ................. | H04L 67/10 |
| 10,860,364 B2* | 12/2020 | Rizvi | .................... | G06F 11/203 |
| 10,880,248 B2* | 12/2020 | Kapadia | .................. | H04L 51/12 |
| 2017/0371693 A1* | 12/2017 | Corrie | ................... | G06F 16/188 |
| 2019/0354386 A1* | 11/2019 | Cahana | ................. | G06F 9/5016 |

(Continued)

OTHER PUBLICATIONS

Ernst, E. et al. "Kata Containers Architecture," GitHub, Inc., 2019, 22 pages, URL: https://github.com/kata-containers/documentation/blob/master/design/architecture.md.

(Continued)

*Primary Examiner* — Van H Nguyen
(74) *Attorney, Agent, or Firm* — Kim & Stewart LLP

(57) ABSTRACT

An example method of managing storage for a containerized application executing in a virtualized computing system having a cluster of hosts and a virtualization layer executing thereon, is described. The method includes receiving, at a supervisor container orchestrator, a request for a first persistent volume lifecycle operation from a guest container orchestrator, the supervisor container orchestrator being part of an orchestration control plane integrated with the virtualization layer and configured to manage a guest cluster and virtual machines (VMs), supported by the virtualization layer, in which the guest cluster executes, the guest container orchestrator being part of the guest cluster; and sending, in response to the first persistent volume lifecycle operation, a request for a second persistent volume lifecycle operation from the supervisor container orchestrator to a storage provider of the virtualized computing system to cause the storage provider to perform an operation on a storage volume.

20 Claims, 8 Drawing Sheets

(56) References Cited

U.S. PATENT DOCUMENTS

2021/0034423 A1* 2/2021 Hallur .................. G06F 21/31
2021/0109683 A1* 4/2021 Cain ................... G06F 3/067

OTHER PUBLICATIONS

Lipovetsky, D. "Cluster API v1alpha3 Delivers New Features and an Improved User Experience," Kubernetes Blog, Apr. 21, 2020, 6 pages, URL: https://kubernetes.io/blog/2020/04/21/cluster-api-v1alpha3-delivers-new-features-and-an-improved-user-experience/.
"The Cluster API Book," Date Unknown, 206 pages, retrieved online Jul. 31, 2020, URL: https://cluster-api.sigs.k8s.io/print.html.
VMware, Inc. "Overview of vSphere Integrated Containers," Product version: 1.5, 2019, 21 pages.
U.S. Appl. No. 16/751,529, filed Jan. 24, 2020, 48 pages.

* cited by examiner

PARAVIRTUAL STORAGE LAYER FOR A CONTAINER ORCHESTRATOR IN A VIRTUALIZED COMPUTING SYSTEM

Applications today are deployed onto a combination of virtual machines (VMs), containers, application services, and more. For deploying such applications, a container orchestrator (CO) known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into logical unit called "pods" that execute on nodes in a cluster (also referred to as "node cluster"). Containers in the same pod share the same resources and network and maintain a degree of isolation from containers in other pods. The pods are distributed across nodes of the cluster. In a typical deployment, a node includes an operating system (OS), such as Linux®, and a container engine executing on top of the OS that supports the containers of the pod. A node can be a physical server or a VM.

A Kubernetes system supports stateful applications, where pods use persistent volumes (PVs) to store persistent data. Early Kubernetes versions included internal "provider" code that provisioned the storage volumes backing PVs within the underlying infrastructure (e.g., virtual disks stored on block devices). Recent Kubernetes versions utilize the container storage interface (CSI), which provides an application programming interface (API) between container orchestrators and storage providers to allow consistent interoperability. Third-party storage providers write and deploy CSI drivers (also referred to as CSI plugins) that extend Kubernetes to support underlying storage volumes of an infrastructure. Kubernetes uses the CSI API to provision, attach, mount, and format the storage volumes exposed by the CSI driver. The CSI driver cooperates with a storage provider in the underlying infrastructure to manage persistent volume lifecycle operations for the containerized applications (e.g., create, attach, detach, and delete the storage volumes).

Some deployments of a Kubernetes system in a virtualized computing system may exhibit isolation between the Kubernetes system and the virtual infrastructure (VI) control plane, including the storage provider. In such a deployment, the CSI driver does not have network access to, or credentials for, accessing the storage provider. It is desirable, however, for such a Kubernetes deployment to be capable of supporting stateful applications, which requires provisioning and management of PVs and their corresponding storage volumes.

DETAILED DESCRIPTION

Figure 1:
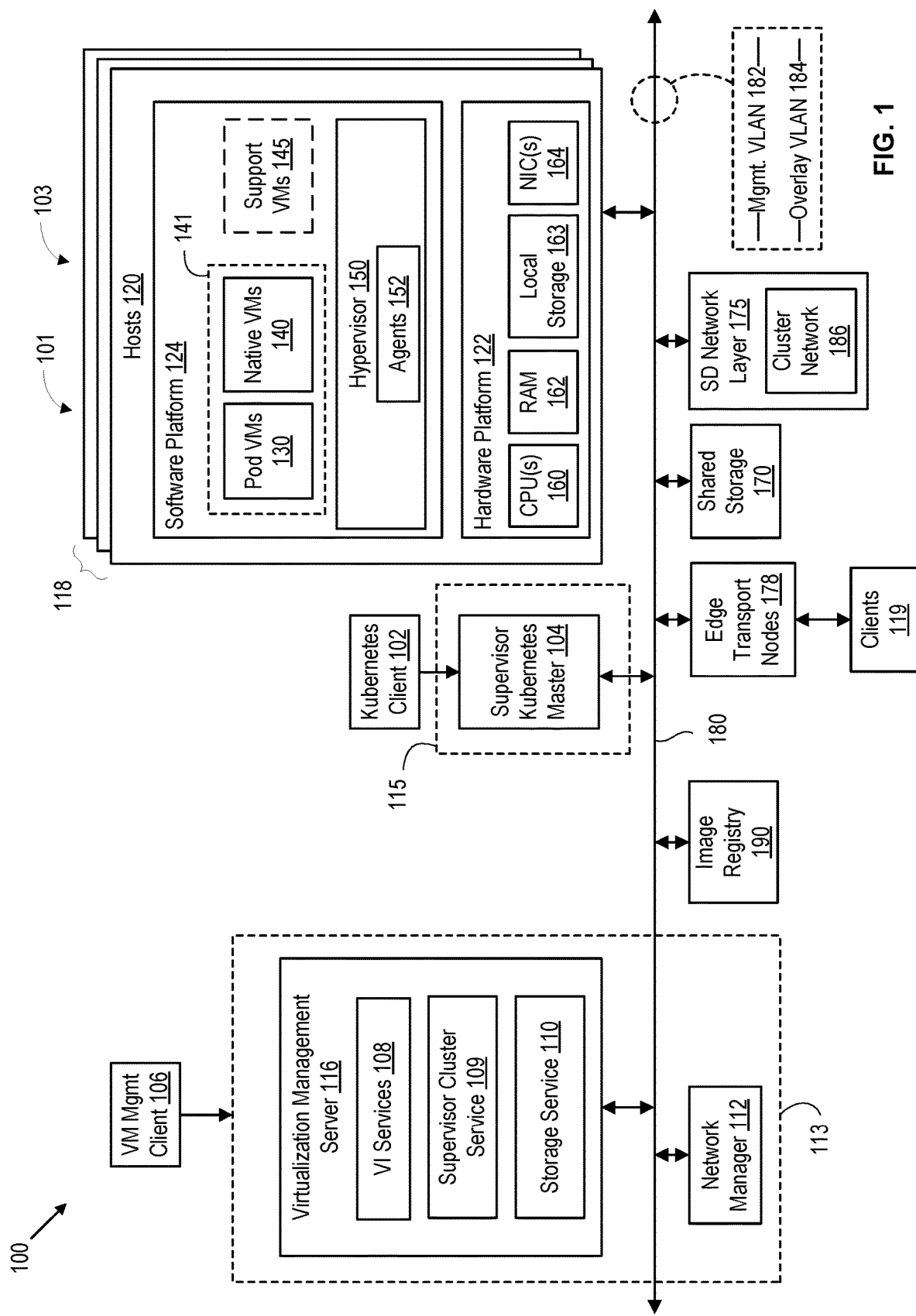
FIG. 1 is a block diagram of a virtualized computing system in which embodiments described herein may be implemented.

Techniques for providing a paravirtual storage layer for a container orchestrator in a virtualized computing system are described. In embodiments described herein, the virtualized computing system includes a cluster of physical servers ("hosts") referred to as a "host cluster." The host cluster includes a virtualization layer, executing on hardware platforms of the hosts, which supports execution of virtual machines (VMs). A virtualization management server manages the host cluster, the virtualization layer, and the VMs executing thereon. The virtualized computing system includes shared storage accessible by the host cluster. The container orchestrator executes in the virtualized computing system (e.g., on one or more VMs) and is configured to deploy and manage applications in the host cluster. In embodiments, the container orchestrator is a Kubernetes system that deploys and manages containerized applications in a cluster of VMs (a "Kubernetes cluster"). For stateful applications, the container orchestrator is configured to manage persistent volumes. The shared storage includes storage volumes (e.g., virtual disks) that back the persistent volumes for use by the containerized applications. A storage provider executes in the virtualized computing system and manages the lifecycles of the storage volumes (also referred to herein as container volumes). The container orchestrator is part of a "guest cluster" deployed in virtualized computing system under management of an underlying orchestration control plane. In this context, the container orchestrator is referred to as a "guest container orchestrator." The guest cluster and hence the guest container orchestrator is isolated from the virtualization management server and the storage provider. As such, the guest container orchestrator does not directly communicate with the storage provider for persistent volume operations. Rather, the guest container orchestrator includes a paravirtual storage layer, as discussed further below.

In one or more embodiments, the orchestration control plane comprises a supervisor container orchestrator having extensions that cooperate with the virtualization management server and agents installed in the virtualization layer. A host cluster having the orchestration control plane is referred to herein as a "supervisor cluster." A user interacts with the orchestration control plane to deploy and manage applications executing on the supervisor cluster. In embodiments, the orchestration control plane uses hosts to implement nodes, and VMs to implement pods, of a Kubernetes cluster. Kubernetes pods are implemented as "pod VMs," each of which includes a kernel and container engine that supports execution of containers. The container orchestrator (e.g., Kubernetes) executes in VMs alongside the pod VMs.

In one or more embodiments, an application deployed in a supervisor cluster comprises a guest cluster executing as a virtual extension of the supervisor cluster and having the guest container orchestrator (e.g., a Kubernetes cluster). The supervisor container orchestrator manages the guest cluster as an application deployed across VMs in the supervisor cluster. In embodiments, the guest cluster is isolated from the storage provider (e.g., the guest cluster is isolated from the management network). However, the guest cluster has network access to the supervisor container orchestrator (e.g., through a cluster network). The guest container orchestrator includes a paravirtual storage layer having a paravirtual CSI driver. The paravirtual CSI driver cooperates with the supervisor container orchestrator, which in turn cooperates with the storage provider. These and further advantages and aspects of the disclosed techniques are described below with respect to the drawings.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, Calif.

In the example of FIG. 1, host cluster 118 is enabled as a "supervisor cluster," described further herein, and thus VMs executing on each host 120 include pod VMs 130 and native VMs 140. A pod VM 130 is a virtual machine that includes a kernel and container engine that supports execution of containers, as well as an agent (referred to as a pod NM agent) that cooperates with a controller of an orchestration control plane 115 executing in hypervisor 150 (referred to as a pod VM controller). An example of pod VM 130 is described further below with respect to FIG. 2. VMs 130/140 support applications 141 deployed onto host cluster 118, which can include containerized applications (e.g., executing in either pod VMs 130 or native VMs 140) and applications executing directly on guest operating systems (non-containerized)(e.g., executing in native VMs 140). One specific application discussed further herein is a guest cluster executing as a virtual extension of a supervisor cluster. Some VMs 130/140, shown as support VMs 145, have specific functions within host cluster 118. For example, support VMs 145 can provide control plane functions, edge transport functions, and the like. An embodiment of software platform 124 is discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs. For example, edge transport nodes 178 can be implemented in support VMs 145 and include a gateway of SD network layer 175. Various clients 119 can access service(s) in virtualized computing system through edge transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualization management server 116 further enables host cluster 118 as a supervisor cluster 101. Virtualization management server 116 installs additional agents 152 in hypervisor 150 to add host 120 to supervisor cluster 101. Supervisor cluster 101 integrates an orchestration control plane 115 with host cluster 118. In embodiments, orchestration control plane 115 includes software components that support a container orchestrator, such as Kubernetes, to deploy and manage applications on host cluster 118. By way of example, a Kubernetes container orchestrator is described herein. In supervisor cluster 101, hosts 120 become nodes of a Kubernetes cluster and pod VMs 130 executing on hosts 120 implement Kubernetes pods. Orchestration control plane 115 includes supervisor Kubernetes master 104 and agents 152 executing in virtualization layer (e.g., hypervisors 150). Supervisor Kubernetes master 104 includes control plane components of Kubernetes, as well as custom controllers, custom plugins, scheduler extender, and the like that extend Kubernetes to interface with virtualization management server 116 and the virtualization layer. For purposes of clarity, supervisor Kubernetes master 104 is shown as a separate logical entity. For practical implementations, supervisor Kubernetes master 104 is implemented as one or more VM(s) 130/140 in host cluster 118. Further, although only one supervisor Kubernetes master 104 is shown, supervisor cluster 101 can include more than one supervisor Kubernetes master 104 in a logical cluster for redundancy and load balancing.

In an embodiment, virtualized computing system 100 further includes a storage service 110 that implements a storage provider in virtualized computing system 100 for container orchestrators. In embodiments, storage service 110 manages lifecycles of storage volumes (e.g., virtual disks) that back persistent volumes used by containerized applications executing in host cluster 118. A container orchestrator such as Kubernetes cooperates with storage service 110 to provide persistent storage for the deployed applications. In the embodiment of FIG. 1, supervisor Kubernetes master 104 cooperates with storage service 110 to deploy and manage persistent storage in the supervisor cluster environment Other embodiments described below include a vanilla container orchestrator environment and a guest cluster environment. Storage service 110 can execute in virtualization management server 116 as shown or operate independently from virtualization management server 116 (e.g., as an independent physical or virtual server).

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes One example of an SD networking platform that can be configured and used in embodiments described herein as network manager 112 and SD network layer 175 is a VMware NSX® platform made commercially available by VMware, Inc. of Palo Alto, Calif.

Network manager 112 can deploy one or more transport zones in virtualized computing system 100, including VLAN transport zone(s) and an overlay transport zone. A VLAN transport zone spans a set of hosts 120 (e.g., host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

In an embodiment, system 100 further includes an image registry 190. As described herein, containers of supervisor cluster 101 execute in pod VMs 130. The containers in pod VMs 130 are spun up from container images managed by image registry 190. Image registry 190 manages images and image repositories for use in supplying images for containerized applications.

Virtualization management server 116 and network manager 112 comprise a virtual infrastructure (VI) control plane 113 of virtualized computing system 100. Virtualization management server 116 can include a supervisor cluster service 109, storage service 110, and VI services 108. Supervisor cluster service 109 enables host cluster 118 as supervisor cluster 101 and deploys the components of orchestration control plane 115. VI services 108 include various virtualization management services, such as a distributed resource scheduler (DRS), high-availability (HA) service, single sign-on (SSO) service, virtualization management daemon, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. Kubernetes client 102 is commonly referred to as kubectl. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD network layer 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. In this manner, the user interacts with supervisor Kubernetes master 104 to deploy applications in supervisor cluster 101 within defined supervisor namespaces.

While FIG. 1 shows an example of a supervisor cluster 101, the techniques described herein do not require a supervisor cluster 101. In some embodiments, host cluster 118 is not enabled as a supervisor cluster 101. In such case, supervisor Kubernetes master 104, Kubernetes client 102, pod VMs 130, supervisor cluster service 109, and image registry 190 can be omitted. While host cluster 118 is show as being enabled as a transport node cluster 103, in other embodiments network manager 112 can be omitted. In such case, virtualization management server 116 functions to configure SD network layer 175.

Figure 2:
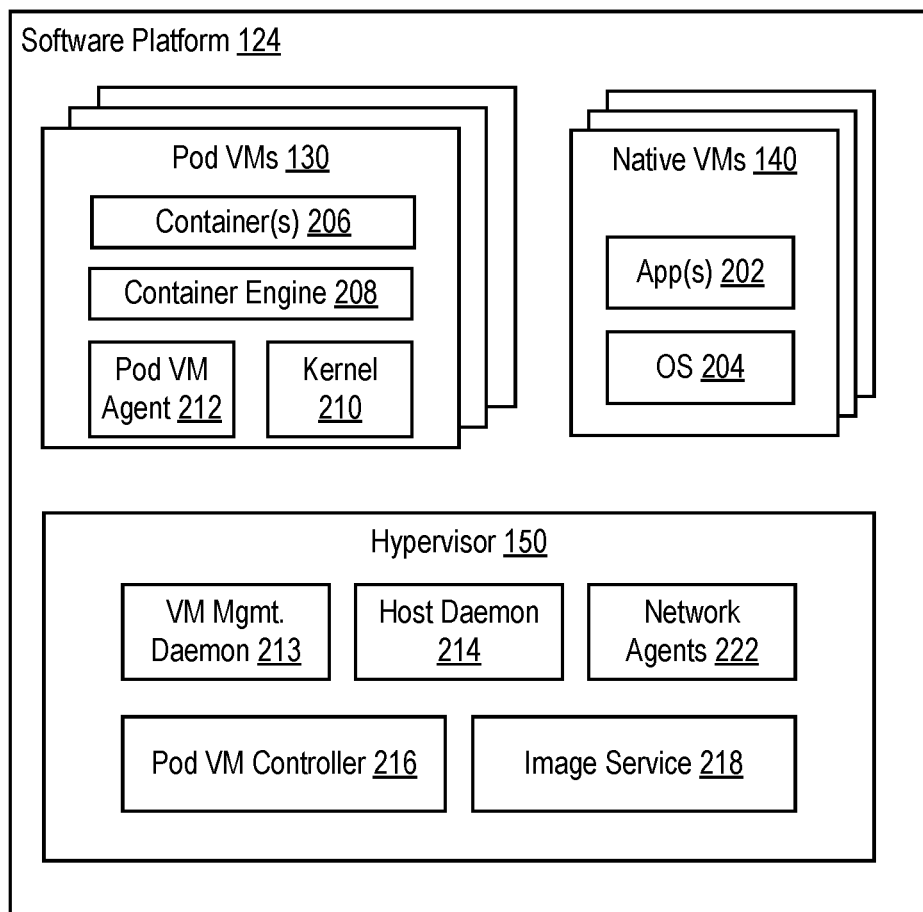
FIG. 2 is a block diagram depicting a software platform according an embodiment.

FIG. 2 is a block diagram depicting software platform 124 according an embodiment. As described above, software platform 124 of host 120 includes hypervisor 150 that supports execution of VMs, such as pod VMs 130, native VMs 140, and support VMs 145. In an embodiment, hypervisor 150 includes a VM management daemon 213, a host daemon 214, a pod VM controller 216, an image service 218, and network agents 222. VM management daemon 213 is an agent 152 installed by virtualization management server 116. VM management daemon 213 provides an interface to host daemon 214 for virtualization management server 116. Host daemon 214 is configured to create, configure, and remove VMs (e.g., pod VMs 130 and native VMs 140).

Pod VM controller 216 is an agent 152 of orchestration control plane 115 for supervisor cluster 101 and allows supervisor Kubernetes master 104 to interact with hypervisor 150. Pod VM controller 216 configures the respective host as a node in supervisor cluster 101. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured. Pod VM controller 216 is omitted if host cluster 118 is not enabled as a supervisor cluster 101.

Image service 218 is configured to pull container images from image registry 190 and store them in shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images. Image service 218 communicates with pod VM controller 216 during spin-up and configuration of pod VMs 130. In some embodiments, image service 218 is part of pod VM controller 216. In embodiments, image service 218 utilizes system VMs 130/140 in support VMs 145 to fetch images, convert images to container image virtual disks, and cache container image virtual disks in shared storage 170.

Network agents 222 comprises agents 152 installed by network manager 112. Network agents 222 are configured to cooperate with network manager 112 to implement logical network services. Network agents 222 configure the respective host as a transport node in a cluster 103 of transport nodes.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux® kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd. Pod VMs 130, pod VM controller 216, and image service 218 are omitted if host cluster 118 is not enabled as a supervisor cluster 101.

Figure 3:
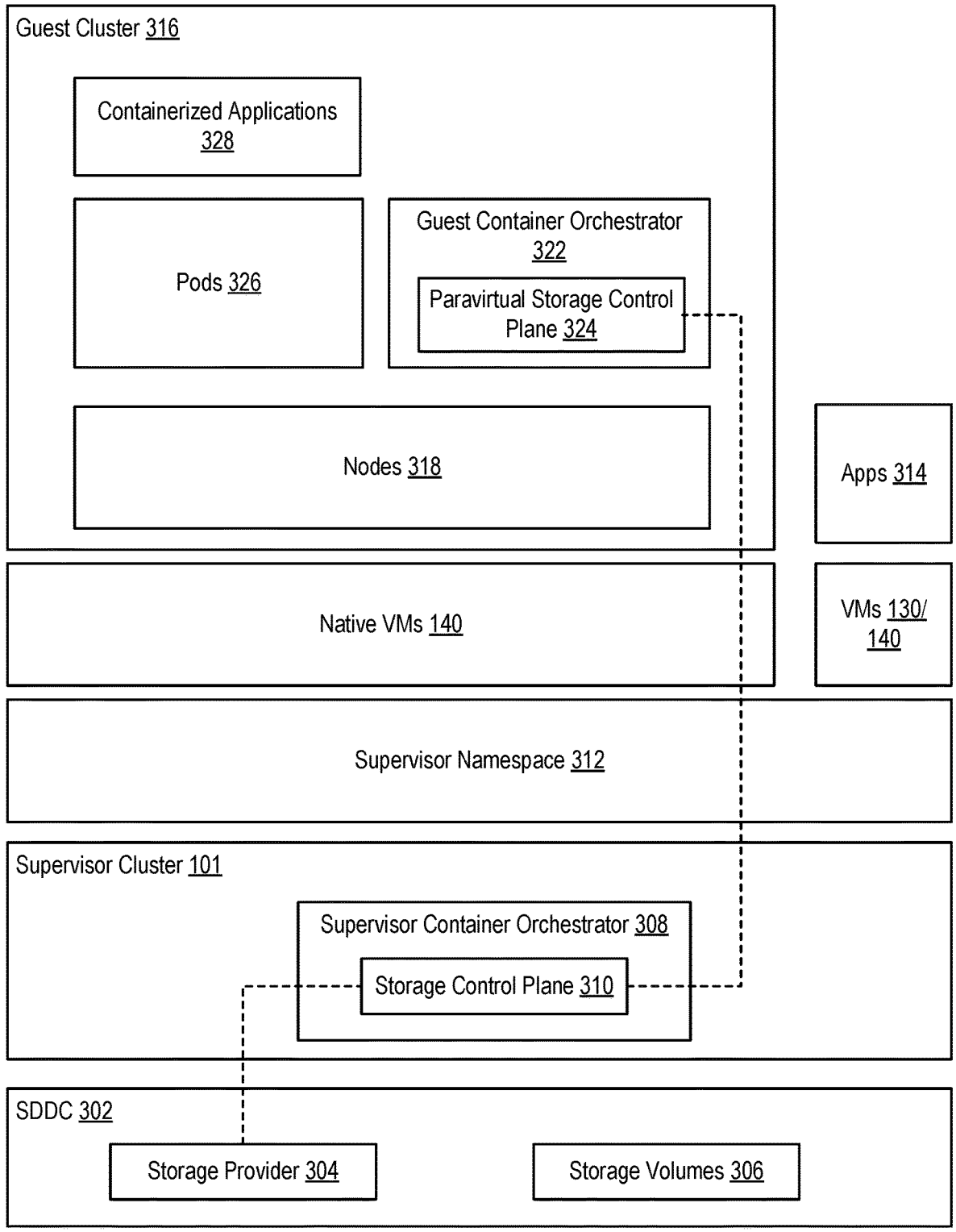
FIG. 3 is a block diagram depicting a logical view of a guest cluster executing in a virtualized computing system according to an embodiment.

FIG. 3 is a block diagram depicting a logical view of a guest cluster executing in a virtualized computing system according to an embodiment. Supervisor cluster 101 is implemented by a software-defined data center (SDDC) 302. SDDC 302 includes virtualized computing system 100 shown in FIG. 1, including host cluster 118, virtualization management server 116, network manager 112, shared storage 170, and SD network layer 175. SDDC 302 includes VI control plane 113 for managing a virtualization layer of host cluster 118, along with shared storage 170 and SD network layer 175. A VI admin interacts with VM management server 116 (and optionally network manager 112) of VI control plane 113 to configure SDDC 302 to implement supervisor cluster 101. SDDC 302 includes a storage provider 304 (e.g., storage service 110) that manages storage volumes 306 in shared storage 170 (e.g., virtual disks). Storage volumes 306 back persistent volumes used by supervisor cluster 101 and guest cluster 316.

Supervisor cluster 101 includes orchestration control plane 115, which includes supervisor Kubernetes master(s) 104 and pod VM controllers 216. The VI admin interacts with VM management server 116 to create supervisor namespaces including supervisor namespace 312. Each supervisor namespace includes a resource pool and authorization constraints. The resource pool includes various resource constraints on the supervisor namespace (e.g., reservation, limits, and share (RLS) constraints). Authorization constraints provide for which roles are permitted to perform which operations in the supervisor namespace (e.g., allowing VI admin to create, manage access, allocate resources, view, and create objects, allowing DevOps to view and create objects; etc.). A user interacts with supervisor Kubernetes master 104 to deploy applications on supervisor cluster 101 within scopes of supervisor namespaces. In the example, the user deploys a guest cluster 316 on native VMs 140 in supervisor namespace 312. The user further deploys applications 314 executing on VMs 130/140 in supervisor namespace 312 alongside guest cluster 316.

Guest cluster 316 is constrained by the authorization and resource policy applied by supervisor namespace 312 in which it is deployed. Orchestration control plane 115 includes guest cluster infrastructure software (GCIS) configured to realize guest cluster 316 as a virtual extension of supervisor cluster 101. Guest cluster 316 includes nodes that are realized as native VMs 140. A guest container orchestrator 322 (e.g., Kubernetes master(s)) execute on nodes 318. Guest container orchestrator 322 manages pods 326, which execute on nodes 318. Containerized applications 328 execute in pods 326. Guest container orchestrator 322 includes a paravirtual storage control plane 324. Paravirtual storage control plane 324 handles persistent volume lifecycle operations for persistent volumes used by containerized applications 328 in guest cluster 316. Persistent volume lifecycle operations include create, delate, attach, detach, and the like type operations on persistent volumes.

Paravirtual storage control plane 324 does not directly communicate with storage provider 304. For example, in embodiments, guest cluster 316 is not connected to the management network and cannot access storage provider 304 in VI control plane 113. Rather, paravirtual storage control plane 324 communicates with a storage control plane 310 in supervisor container orchestrator 308. Storage control plane 310 handles persistent volume lifecycle operations used by applications deployed in supervisor namespace 312, include applications 314 and guest cluster 316. Unlike paravirtual storage control plane 324, storage control plane 310 is capable of communication with storage provider 304 (e.g., supervisor container orchestrator 308 is connected to the management network and can access storage provider 304). Storage control plane 310 translates persistent volume lifecycle operations provided by paravirtual storage control plane 324 into storage operations for storage provider 304.

Figure 4:
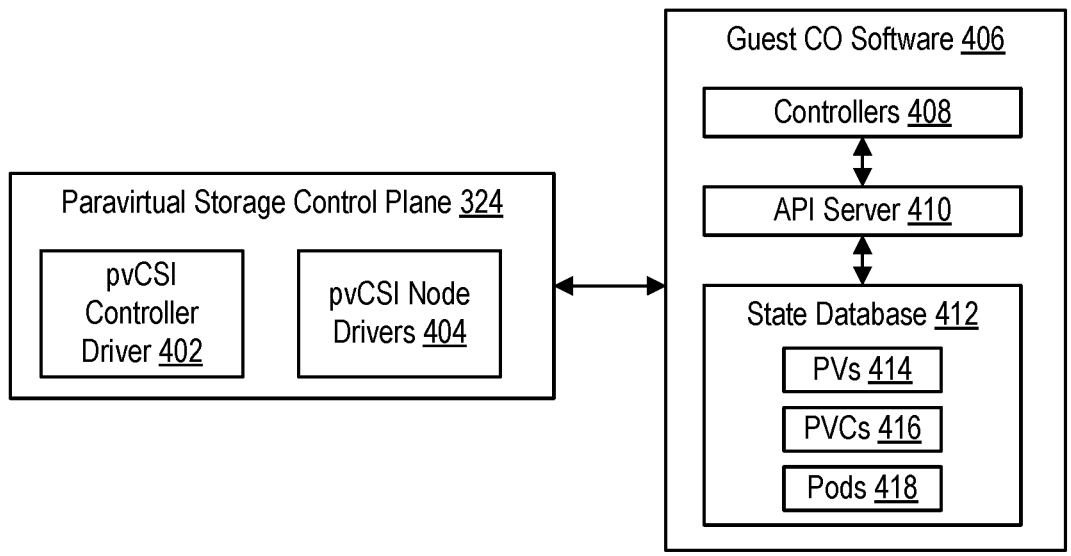
FIG. 4 is a block diagram depicting software executing in a guest cluster according to an embodiment.

FIG. 4 is a block diagram depicting software executing in guest cluster 316 according to an embodiment. The software includes guest CO software 406 in communication with paravirtual storage control plane 324. The software in FIG. 4 executes on nodes 318, which are backed by native VMs 140. Guest CO software 406 can execute in one or more master servers of the guest CO (e.g., one or more Kubernetes masters). Guest CO software 406 includes API server 410, controllers 408, and a state database 412. In an embodiment, API server 410 includes the Kubernetes API server, kube-api-server. State database 412 stores the state of guest cluster 316 (e.g., etcd) as objects are created by API server 410. A user can provide application specification data to API server 410 that defines various objects supported by the API (e.g., as a YAML document). The objects have specifications that represent the desired state. State database 412 stores the objects defined by application specification data as part of the guest cluster state. Standard Kubernetes objects include persistent volumes (PVs) 414, persistent volume claims (PVCs) 416, and pods 418, among others.

Controllers 408 can include, for example, standard Kubernetes controllers (e.g., kube-controller-manager controllers, cloud-controller-manager controllers, etc.) Controllers 408 track objects in state database 412 of at least one resource type Controllers 408 are responsible for making the current state of guest cluster 316 come closer to the desired state as stored in state database 412. A controller 308 can carry out action(s) by itself, send messages to API server 410 to have side effects, and/or interact with external systems.

Paravirtual storage control plane 324 includes paravirtual container storage interface (pvCSI) controller driver 402 and pvCSI node drivers 404. Each node 318 includes a pvCSI node driver 404 configured to format and mount volumes in native VMs 140 and bind mount volumes into pods executing in nodes 318. The pvCSI controller driver 402 is configured to cooperate with guest CO software 406 and supervisor CO software 504 (FIG. 5) to create, delete, attach, and detach persistent volumes, as described in the various flows below.

Figure 5:
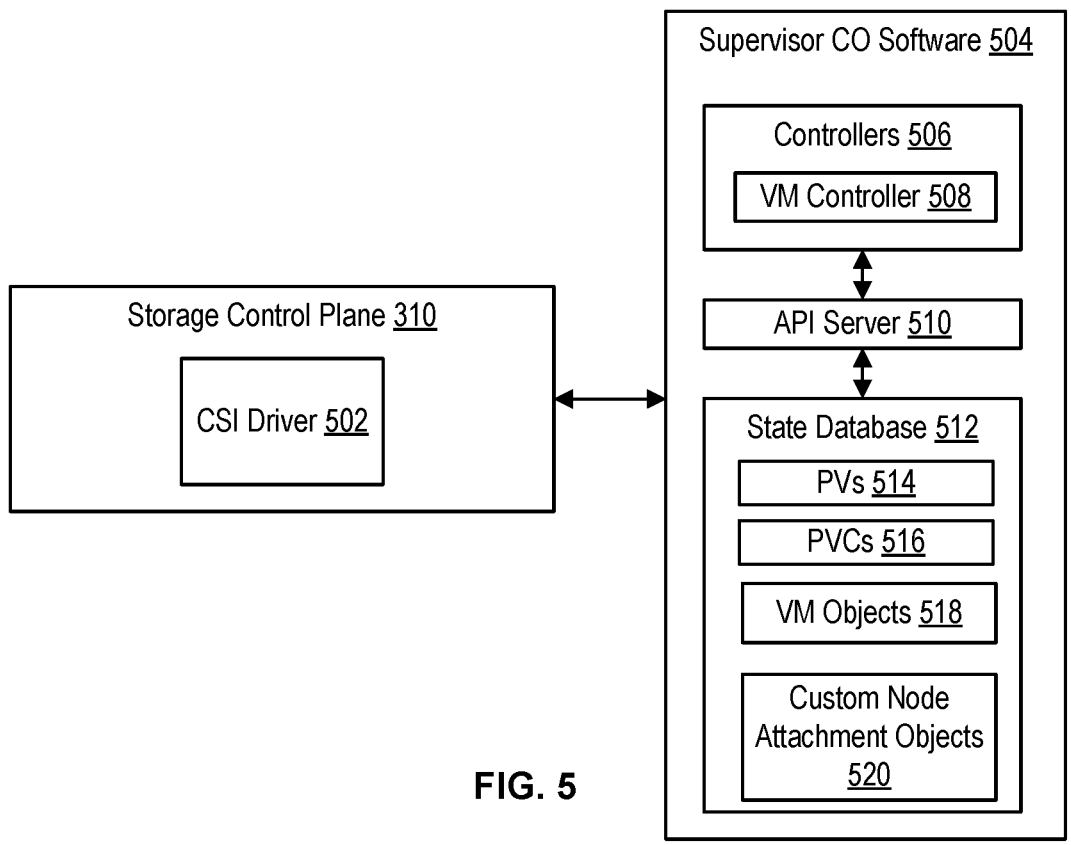
FIG. 5 is a block diagram depicting software executing in a supervisor cluster according to an embodiment.

FIG. 5 is a block diagram depicting software executing in supervisor cluster 101 according to an embodiment. The software includes supervisor CO software 504 in communication with storage control plane 310. The software in FIG. 5 executes on VMs 130/140. Supervisor CO software 504 can execute in one or more supervisor Kubernetes masters 104. Supervisor CO software 406 includes API server 510, controllers 506, and a state database 512. In an embodiment, API server 510 includes the Kubernetes API server, kube-api-server. State database 512 stores the state of supervisor cluster 101 (e.g., etcd) as objects are created by API server 510. A user can provide application specification data to API server 510 that defines various objects supported by the API (e.g., as a YAML document). The objects have specifications that represent the desired state. State database 512 stores the objects defined by application specification data as part of the supervisor cluster state. Standard Kubernetes objects include PVs 514 and PVCs 516, among others. API server 510 also supports custom objects through custom APIs. Custom APIs are API extensions of the Kubernetes API using either the custom resource/operator pattern or the API extension server pattern. Custom APIs are used to create and manage custom resources, such including VM objects 518 and custom node attachment objects 520.

Controllers 506 can include, for example, standard Kubernetes controllers (e.g., kube-controller-manager controllers, cloud-controller-manager controllers, etc.) and custom controllers, including VM controller 508. Standard Kubernetes controllers are discussed above and the same as controllers 408 in guest CO software 406. Custom controllers include controllers for managing lifecycle of custom objects. For example, VM controller 508 is configured to manage VM objects 518.

Storage control plane 310 includes CSI driver 502. CSI driver 502 is configured to cooperate with supervisor CO software 504 and storage provider 304 to create, delete, attach, and detach storage volumes to back persistent volumes, as described in the various flows below. CSI driver 502 is further configured to monitor and manage custom node attachment objects 520, as described further below.

Figure 6:
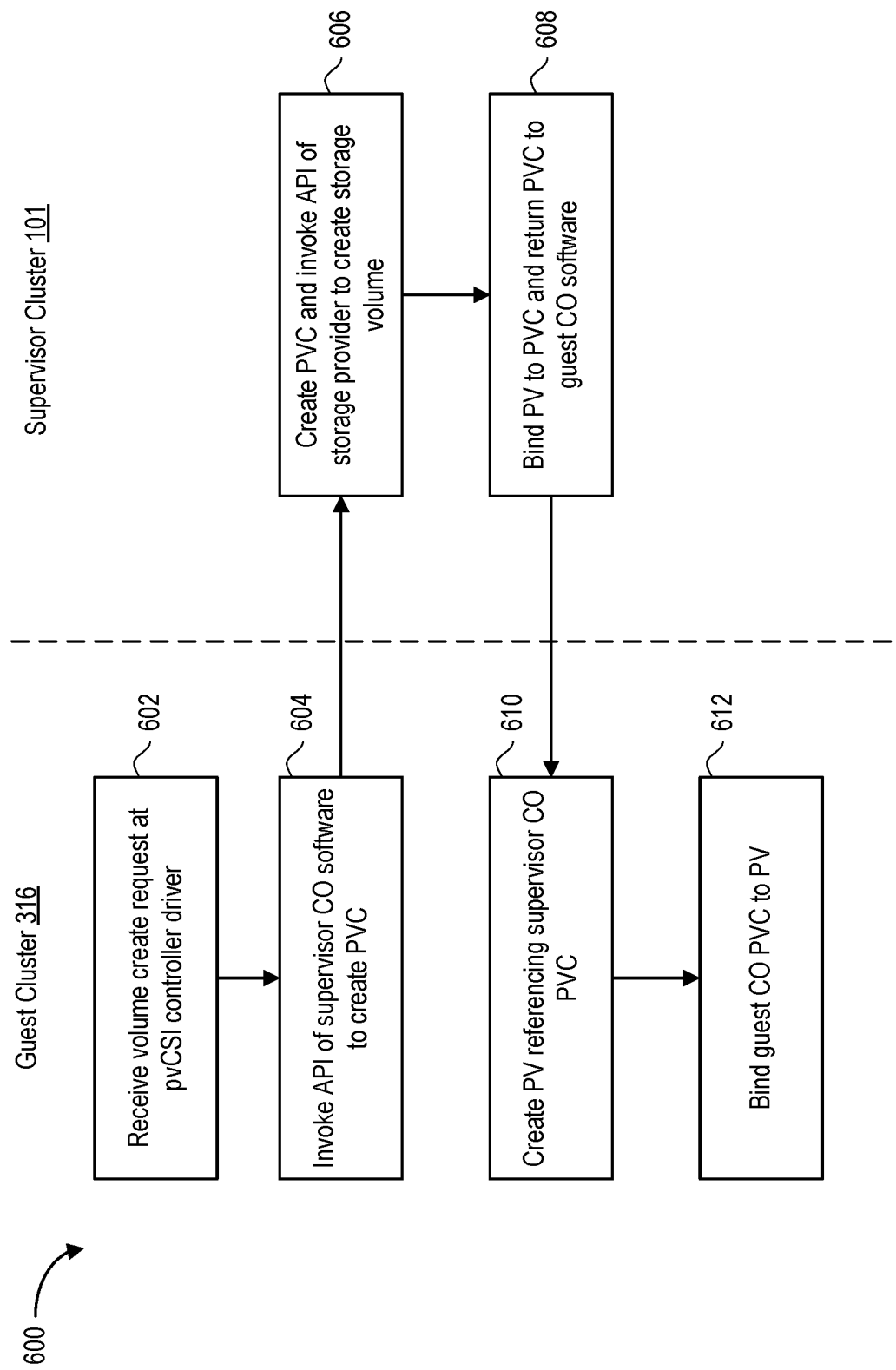
FIG. 6 is a flow diagram depicting a method of creating a persistent volume for a containerized application in a guest cluster according to an embodiment.

FIG. 6 is a flow diagram depicting a method 600 of creating a persistent volume for a containerized application in a guest cluster according to an embodiment. Method 600 can be performed by software in guest cluster 316 in cooperation with software in supervisor cluster 101 executing on CPU, memory, storage, and network resources managed by virtualization layer(s) (e.g., hypervisor(s)) or a host operating system(s). Method 600 can be understood with reference to FIGS. 4-5.

Method 600 begins at step 602, where pvCSI controller driver 402 receives a volume create request. For example, a user can interact with API server 410 to create a PVC 416 or pod 418 requiring a PVC 416. In response, guest CO software 406 invokes pvCSI controller driver 402 to create a PV 414 bound to a PVC 416. At step 604, pvCSI controller driver 402 invokes the API of supervisor CO software 504 (e.g., via API server 510) to create a PVC 516 in supervisor cluster 101. PVC 516 in supervisor cluster 101 backs PV 414 in guest cluster 316.

At step 606, supervisor CO software 504 creates a PVC 516 through API server 410. In response, supervisor CO software 504 invokes CSI driver 502 to create a volume, which in turn invokes an API of storage provider 304 to create a storage volume 306. At step 608, supervisor CO software 504 binds a PV 514, which is backed by the created storage volume 306, to PVC 516 created in step 606. At step 610, guest CO software 406 creates a PV 414, which is backed by PVC 516 created in step 606. At step 612, guest CO software 406 binds a PVC 416 to PV 414 created in step 610.

Figure 7:
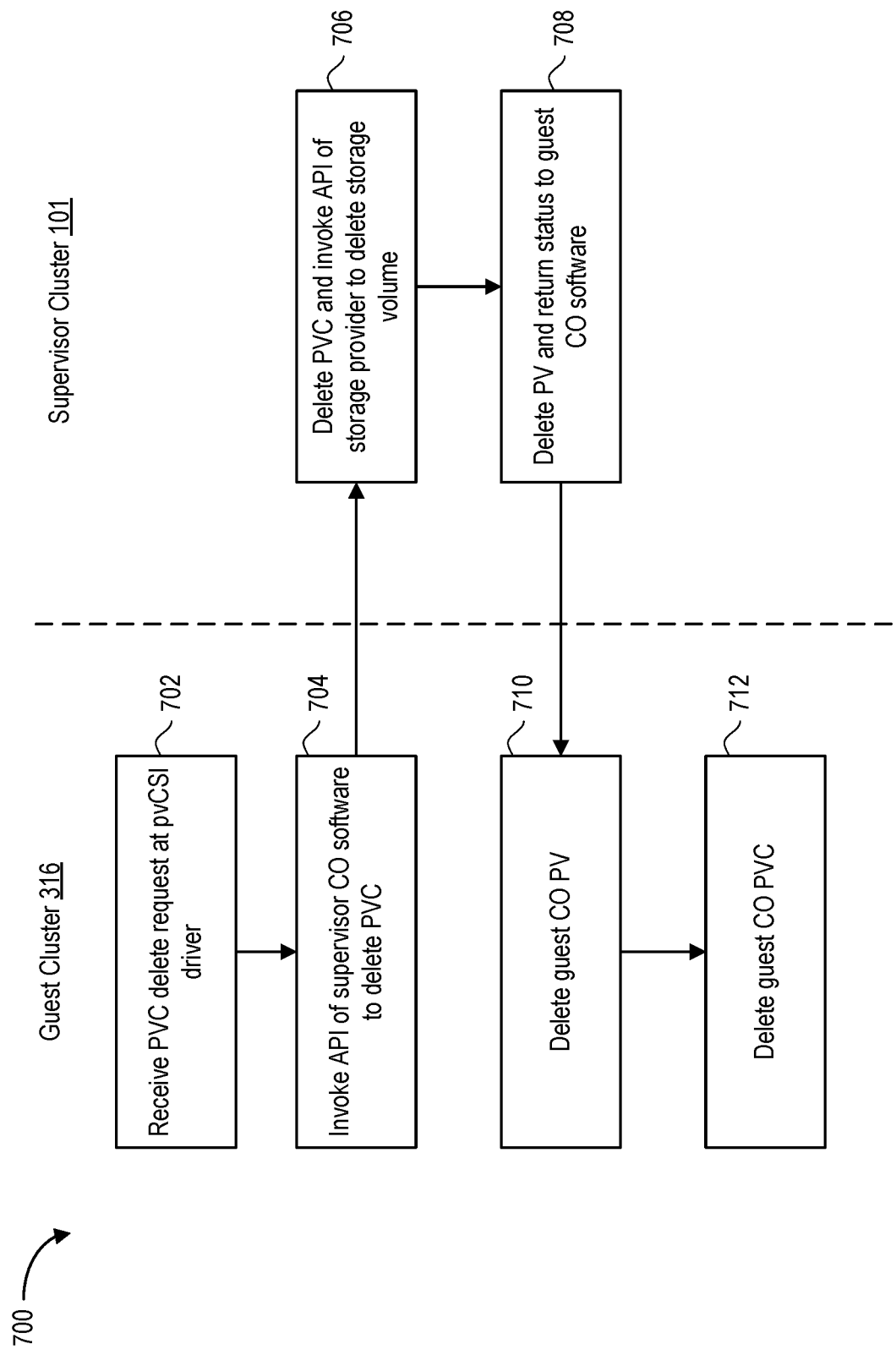
FIG. 7 is a flow diagram depicting a method of deleting a persistent volume for a containerized application in a guest cluster according to an embodiment.

FIG. 7 is a flow diagram depicting a method 700 of deleting a persistent volume for a containerized application in a guest cluster according to an embodiment. Method 700 can be performed by software in guest cluster 316 in cooperation with software in supervisor cluster 101 executing on CPU, memory, storage, and network resources managed by virtualization layer(s) (e.g., hypervisor(s)) or a host operating system(s). Method 700 can be understood with reference to FIGS. 4-5.

Method 700 begins at step 702, where pvCSI controller driver 402 receives a volume delete request. For example, a user can interact with API server 410 to delete a PVC 416 or pod 418 requiring a PVC 416, or a pod 418 using a PVC 416 can terminate causing the PVC to be reclaimed. In response, guest CO software 406 invokes pvCSI controller driver 402 to delete PVC 416. At step 704, pvCSI controller driver 402 invokes the API of supervisor CO software 504 (e.g., via API server 510) to delete a PVC 516 in supervisor cluster 101. PVC 516 in supervisor cluster 101 backs PV 414 in guest cluster 316 that is bound to the deleted PVC 416.

At step 706, supervisor CO software 504 deletes PVC 516 through API server 410. In response, supervisor CO software 504 invokes CSI driver 502 to delete the storage volume, which in turn invokes an API of storage provider 304 to delete storage volume 306. At step 708, supervisor CO software 504 deletes PV 514 that was backed by the deleted storage volume 306 and returns the status of the deletion operation to guest CO software 406. At step 710, guest CO software 406 deletes PV 414, which was backed by PVC 516 deleted in step 706. At step 712, guest CO software 406 deletes PVC 416 as requested in step 702.

Figure 8:
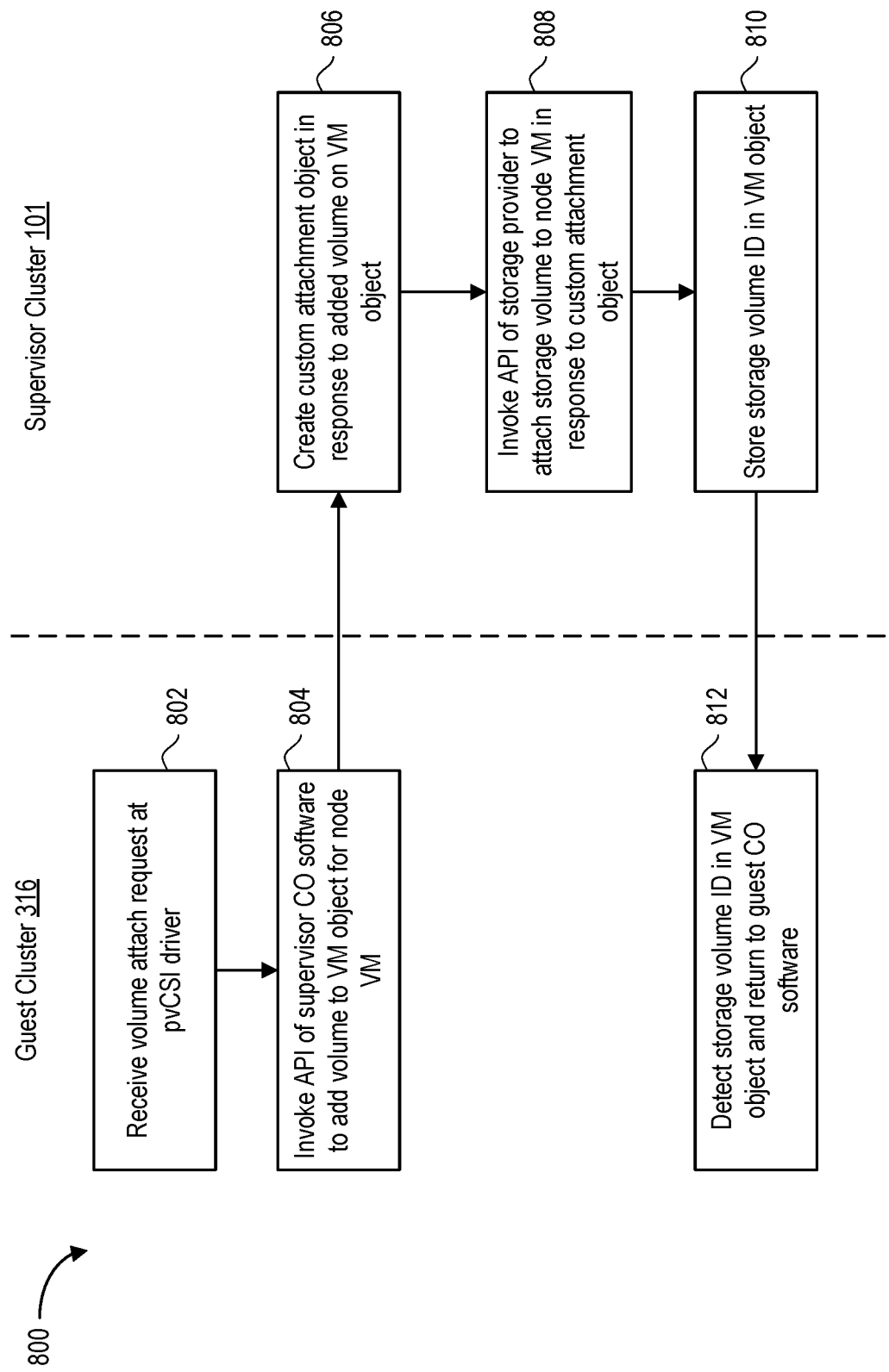
FIG. 8 is a flow diagram depicting a method of attaching a persistent volume for a containerized application in a guest cluster according to an embodiment.

FIG. 8 is a flow diagram depicting a method 800 of attaching a persistent volume for a containerized application in a guest cluster according to an embodiment. Method 800 can be performed by software in guest cluster 316 in cooperation with software in supervisor cluster 101 executing on CPU, memory, storage, and network resources managed by virtualization layer(s) (e.g., hypervisor(s)) or a host operating system(s). Method 800 can be understood with reference to FIGS. 4-5.

Method 800 begins at step 802, where pvCSI controller driver 402 receives a request to attach a volume to a node. For example, guest CO software 406 can provision a pod to a node that requires attachment of a persistent volume. At step 804, pvCSI controller driver 402 invokes an API of supervisor CO software 504 (e.g., via API server 510) to add a specified volume to a VM object 518 for the node. For example, a pod being deployed references a PVC 416, which is bound to a PV 414 that is backed by a PVC 516. The pvCSI controller driver 402 adds an ID of PVC 516 to a VM object 518 representing the node in which the pod is deployed. VM object 518 represents a native VM 140 managed by supervisor CO software 504 (e.g., through VM controller 508).

At step 806, VM controller 508 creates a custom node attachment object 520 in response to detecting the added PVC ID to VM object 518. At step 808, CSI driver 502 invokes an API of storage provider 304 to attach storage volume 306 to native VM 140 implementing the node in response to detection of custom node attachment object 520. CSI driver 502 obtains a volume ID from a PV 514 that is bound to PVC 516. At step 810, CSI driver 502 stores the volume ID of storage object in VM object 518. At step 812, pvCSI driver 402 detects the presence of storage volume ID in VM object 518 and returns status to guest CO software 406. Guest CO software 406 can then proceed with volume attachment (e.g., by creating a volume attachment object that is noticed by kubelet, which in turn invokes pvCSI node driver 404 to mount the storage volume to the VM).

Figure 9:
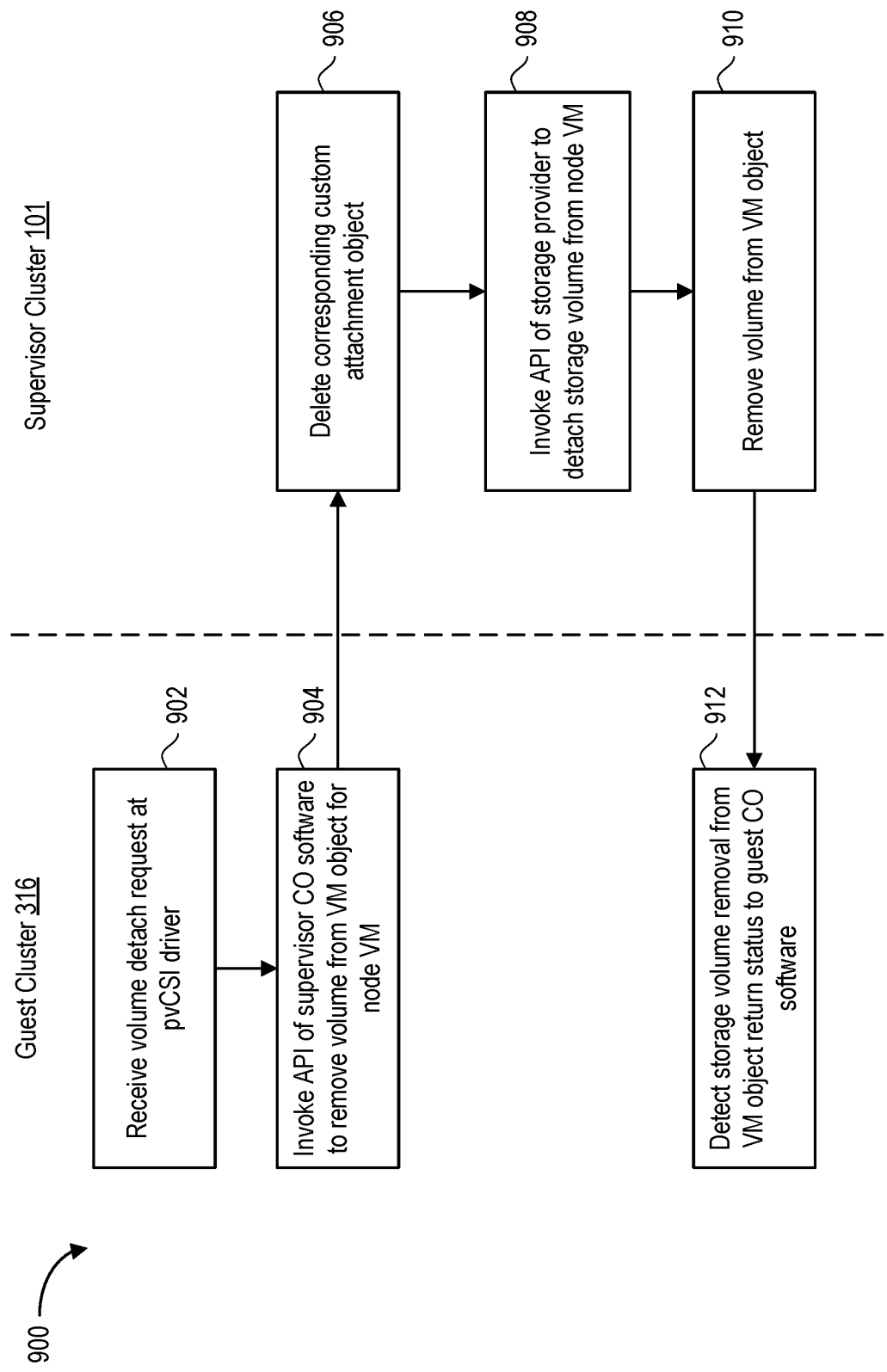
FIG. 9 is a flow diagram depicting a method of detaching a persistent volume from a containerized application in a guest cluster according to an embodiment.

FIG. 9 is a flow diagram depicting a method 900 of detaching a persistent volume from a containerized application in a guest cluster according to an embodiment. Method 900 can be performed by software in guest cluster 316 in cooperation with software in supervisor cluster 101 executing on CPU, memory, storage, and network resources managed by virtualization layer(s) (e.g., hypervisor(s)) or a host operating system(s). Method 900 can be understood with reference to FIGS. 4-5.

Method 900 begins at step 902, where pvCSI controller driver 402 receives a request to detach a volume from a node. For example, guest CO software 406 destroy a pod after a pod has terminated, where the pod used a persistent volume. At step 904, pvCSI controller driver 402 invokes an API of supervisor CO software 504 (e.g., via API server 510) to delete a custom node attachment object 520 corresponding to the persistent volume attachment.

At step 906, API server 510 deletes custom node attachment object 520 per the request from pvCSI controller driver 402 in step 904. At step 908, CSI driver 502 invokes an API of storage provider 304 to detach storage volume 306 from native VM 140 implementing the node in response to detection that custom node attachment object 520 has been deleted. At step 910, CSI driver 502 removes reference to the detected storage volume from VM object 518. At step 912, pvCSI controller driver 402 detects remove of the storage volume ID from VM object 518 and returns status to guest CO software 406. Guest CO software 406 can then proceed with volume detachment (e.g., by deleting a volume attachment object).

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of managing storage for a containerized application executing in a virtualized computing system, the virtualized computing system including a cluster of hosts having a virtualization layer executing thereon, the method comprising:
   receiving, at a supervisor container orchestrator, a request for a first persistent volume lifecycle operation from a guest container orchestrator, the first persistent volume lifecycle operation being an operation on a persistent volume backed by a storage volume of a storage provider of the virtualized computing system, the supervisor container orchestrator being part of an orchestration control plane integrated with the virtualization layer and configured to manage a guest cluster and virtual machines (VMs), supported by the virtualization layer, in which the guest cluster executes, the guest container orchestrator being part of the guest cluster, being isolated from the storage provider, and configured to manage the containerized application; and
   sending, in response to the first persistent volume lifecycle operation, a request for a second persistent volume lifecycle operation from the supervisor container orchestrator to the storage provider to cause the storage provider to perform an operation on the storage volume.

2. The method of claim 1, wherein the step of receiving the request comprises servicing an application programming interface (API) call at the supervisor container orchestrator to create a first persistent volume claim (PVC), wherein the step of sending the request comprises invoking an API of the storage provider to create the storage volume, and wherein the supervisor container orchestrator manages a first persistent volume (PV), backed by the storage volume, bound to the first PVC.

3. The method of claim 2, wherein the guest container orchestrator manages a second PV backed by the first PVC, the second PV bound to a second PVC managed by the guest container orchestrator and used by the containerized application.

4. The method of claim 1, wherein the step of receiving the request comprises servicing an application programming interface (API) call at the supervisor container orchestrator to update a custom object associated with a first VM of the VMs, and wherein the step of sending the request comprises invoking an API of the storage provider to attach the storage volume to the first VM.

5. The method of claim 1, wherein the step of receiving the request comprises servicing an application programming interface (API) call at the supervisor container orchestrator to update a custom object associated with a first VM of the VMs, and wherein the step of sending the request comprises invoking an API of the storage provider to detach the storage volume from the first VM.

6. The method of claim 1, wherein the step of receiving the request comprises servicing an application programming interface (API) call at the supervisor container orchestrator to delete a persistent claim volume (PVC), and wherein the supervisor container orchestrator manages a persistent volume (PV), backed by the storage volume, bound to the PVC.

7. The method of claim 6, wherein the step of sending the request comprises invoking an API of the storage provider to delete the storage volume.

8. A non-transitory computer readable medium comprising instructions to be executed in a computing device to cause the computing device to carry out a method of managing storage for a containerized application executing in a virtualized computing system, the virtualized computing system including a cluster of hosts having a virtualization layer executing thereon, the method comprising:
   receiving, at a supervisor container orchestrator, a request for a first persistent volume lifecycle operation from a guest container orchestrator, the first persistent volume lifecycle operation being an operation on a persistent volume backed by a storage volume of a storage provider of the virtualized computing system, the supervisor container orchestrator being part of an orchestration control plane integrated with the virtualization layer and configured to manage a guest cluster and virtual machines (VMs), supported by the virtualization layer, in which the guest cluster executes, the guest container orchestrator being part of the guest cluster, being isolated from the storage provider, and configured to manage the containerized application; and
   sending, in response to the first persistent volume lifecycle operation, a request for a second persistent volume lifecycle operation from the supervisor container orchestrator to the storage provider to cause the storage provider to perform an operation on the storage volume.

9. The non-transitory computer readable medium of claim 8, wherein the step of receiving the request comprises servicing an application programming interface (API) call at the supervisor container orchestrator to create a first persistent volume claim (PVC), wherein the step of sending the request comprises invoking an API of the storage provider to create the storage volume, and wherein the supervisor container orchestrator manages a first persistent volume (PV), backed by the storage volume, bound to the first PVC.

10. The non-transitory computer readable medium of claim 9, wherein the guest container orchestrator manages a second PV backed by the first PVC, the second PV bound to a second PVC managed by the guest container orchestrator and used by the containerized application.

11. The non-transitory computer readable medium of claim 8, wherein the step of receiving the request comprises servicing an application programming interface (API) call at the supervisor container orchestrator to update a custom object associated with a first VM of the VMs, and wherein the step of sending the request comprises invoking an API of the storage provider to attach the storage volume to the first VM.

12. The non-transitory computer readable medium of claim 8, wherein the step of receiving the request comprises servicing an application programming interface (API) call at the supervisor container orchestrator to update a custom object associated with a first VM of the VMs, and wherein the step of sending the request comprises invoking an API of the storage provider to detach the storage volume from the first VM.

13. The non-transitory computer readable medium of claim 8, wherein the step of receiving the request comprises servicing an application programming interface (API) call at the supervisor container orchestrator to delete a persistent claim volume (PVC), and wherein the supervisor container orchestrator manages a persistent volume (PV), backed by the storage volume, bound to the PVC.

14. The non-transitory computer readable medium of claim 13, wherein the step of sending the request comprises invoking an API of the storage provider to delete the storage volume.

15. A virtualized computing system, comprising:
a cluster of hosts having a virtualization layer executing thereon and executing a containerized application;
a guest container orchestrator of a guest cluster, the guest cluster executing in virtual machines (VMs) supported by the virtualization layer, the guest container orchestrator configured to manage the containerized application; and
a supervisor container orchestrator, executing on at least one of the hosts, configured to:
receive a request for a first persistent volume lifecycle operation from the guest container orchestrator, the first persistent volume lifecycle operation being an operation on a persistent volume backed by a storage volume of a storage provider of the virtualized computing system, the guest cluster being isolated from the storage provider, the supervisor container orchestrator being part of an orchestration control plane integrated with the virtualization layer and configured to manage the guest cluster and the virtual machines (VMs) in which the guest cluster executes; and
send, in response to the first persistent volume lifecycle operation, a request for a second persistent volume lifecycle operation to the storage provider to cause the storage provider to perform an operation on the storage volume.

16. The virtualized computing system of claim 15, wherein the supervisor container orchestrator is configured to receive the request by servicing an application programming interface (API) call at the supervisor container orchestrator to create a first persistent volume claim (PVC), wherein the supervisor container orchestrator is configured to send the request by invoking an API of the storage provider to create the storage volume, and wherein the supervisor container orchestrator manages a first persistent volume (PV), backed by the storage volume, bound to the first PVC.

17. The virtualized computing system of claim 16, wherein the guest container orchestrator manages a second PV backed by the first PVC, the second PV bound to a second PVC managed by the guest container orchestrator and used by the containerized application.

18. The virtualized computing system of claim 15, wherein the supervisor container orchestrator is configured to receive the request by servicing an application programming interface (API) call at the supervisor container orchestrator to update a custom object associated with a first VM of the VMs, and wherein the supervisor container orchestrator is configured to send the request by invoking an API of the storage provider to attach the storage volume to the first VM.

19. The virtualized computing system of claim 15, wherein the supervisor container orchestrator is configured to receive the request by servicing an application programming interface (API) call at the supervisor container orchestrator to update a custom object associated with a first VM of the VMs, and wherein the supervisor container orchestrator is configured to send the request by invoking an API of the storage provider to detach the storage volume from the first VM.

20. The virtualized computing system of claim 15, wherein the supervisor container orchestrator is configured receive the request by servicing an application programming interface (API) call at the supervisor container orchestrator to delete a persistent claim volume (PVC), and wherein the supervisor container orchestrator manages a persistent volume (PV), backed by the storage volume, bound to the PVC.

* * * * *